United States Patent
Pitman et al.

(10) Patent No.: US 8,641,848 B2
(45) Date of Patent: Feb. 4, 2014

(54) METHOD AND APPARATUS FOR COMBINING ELONGATED STRIPS

(75) Inventors: Frank M. Pitman, Duncan, SC (US); Ryan W. Johnson, Moore, SC (US); Michael Tompkins, Cherryville, NC (US); Anthony S. Brandon, Moore, SC (US)

(73) Assignee: Milliken & Company, Spartanburg, SC (US)

( * ) Notice: Subject to any disclaimer, the term of this patent is extended or adjusted under 35 U.S.C. 154(b) by 387 days.

(21) Appl. No.: 13/065,086

(22) Filed: Mar. 14, 2011

(65) Prior Publication Data

US 2012/0234468 A1    Sep. 20, 2012

(51) Int. Cl.
*B32B 37/00* (2006.01)

(52) U.S. Cl.
USPC ........... 156/199; 156/204; 156/205; 156/208; 156/210

(58) Field of Classification Search
USPC .......... 156/152, 196, 199, 204, 205, 208, 210
See application file for complete search history.

(56) References Cited

U.S. PATENT DOCUMENTS

| | | | |
|---|---|---|---|
| 3,257,256 A | 6/1966 | Lehmacher et al. | 156/495 |
| 3,528,875 A | 9/1970 | MacDonald et al. | 428/132 |
| 3,544,417 A | 12/1970 | Corzine | 161/50 |
| 3,996,084 A | 12/1976 | Holmes | 156/93 |
| 4,068,434 A | 1/1978 | Day et al. | 52/220 |
| 4,083,159 A | 4/1978 | Hatch et al. | 52/309.1 |
| 4,115,610 A | 9/1978 | Wortman | 428/102 |
| 4,147,004 A | 4/1979 | Day et al. | 52/309.9 |
| 4,363,694 A | 12/1982 | Fay | 156/435 |
| 4,463,043 A | 7/1984 | Reeves et al. | 428/68 |
| 4,764,420 A | 8/1988 | Gluck et al. | 428/317.7 |
| 4,774,794 A | 10/1988 | Grieb et al. | 52/309.7 |
| 4,819,608 A | 4/1989 | Filice et al. | 124/23 |
| 5,069,737 A | 12/1991 | Guiton | 156/210 |
| 5,098,778 A | 3/1992 | Minnick et al. | 428/285 |
| 5,192,598 A | 3/1993 | Forte et al. | 428/71 |
| 5,431,996 A | 7/1995 | Giesemann | 428/288 |
| 5,462,623 A | 10/1995 | Day | 156/250 |
| 5,462,626 A | 10/1995 | Kanayama et al. | 156/272.8 |
| 5,475,904 A | 12/1995 | Le Roy | 28/108 |

(Continued)

FOREIGN PATENT DOCUMENTS

| | | |
|---|---|---|
| DE | 19751516 | 5/1999 |
| EP | 0844929 | 4/2002 |

(Continued)

OTHER PUBLICATIONS

Machine translation of French Patent 2560819, date unknown.*

(Continued)

*Primary Examiner* — Jeff Aftergut
(74) *Attorney, Agent, or Firm* — Cheryl J. Brickey (57) ABSTRACT

A method and apparatus for combining elongated strips is provided. The strips are wrapped with a flexible material that may include a reinforcement layer and other layers such as adhesives whereby the strips can be bonded to one another. Additionally, layers of e.g., a stabilizing material may be added to one or both sides of the intermediate formed by the elongated strips and flexible material. The stabilizing material can be e.g., layers of a scrim and/or one or more layers of material that are impregnated with a resin to add strength to the intermediate.

10 Claims, 7 Drawing Sheets

(56) References Cited

U.S. PATENT DOCUMENTS

| | | |
|---|---|---|
| 5,520,976 A | 5/1996 | Giannetti et al. ............ 428/36.3 |
| 5,589,016 A | 12/1996 | Hoopingarner et al. ........ 156/87 |
| 5,589,243 A | 12/1996 | Day ................ 428/56 |
| 5,679,432 A | 10/1997 | Holmquest et al. ............ 428/71 |
| 5,698,057 A | 12/1997 | Abouzahr et al. ............ 156/242 |
| 5,773,121 A | 6/1998 | Meteer et al. ................. 428/117 |
| 5,834,082 A | 11/1998 | Day ................ 428/56 |
| 5,857,414 A | 1/1999 | Thomas et al. ................ 105/397 |
| 5,958,325 A | 9/1999 | Seemann, III et al. ........ 264/510 |
| 6,151,743 A | 11/2000 | Church et al. .................... 14/73 |
| 6,205,728 B1 | 3/2001 | Sutelan ........................ 52/309.7 |
| 6,217,700 B1 | 4/2001 | Knobel ........................ 156/296 |
| 6,497,190 B1 | 12/2002 | Lewit ............................ 114/357 |
| 6,645,333 B2 | 11/2003 | Johnson et al. ................. 156/92 |
| 6,676,785 B2 | 1/2004 | Johnson et al. ................. 156/92 |
| 6,701,683 B2 | 3/2004 | Messenger et al. ........ 52/309.11 |
| 6,740,381 B2 | 5/2004 | Day et al. ........................ 428/56 |
| 6,824,851 B1 | 11/2004 | Locher et al. ................... 428/76 |
| 6,972,144 B2 | 12/2005 | Roth et al. ....................... 428/68 |
| 7,056,567 B2 | 6/2006 | O'Neill et al. ................... 428/71 |
| 7,056,576 B2 | 6/2006 | Johnson .................... 428/309.9 |
| 7,063,887 B2 | 6/2006 | Kobe et al. ................. 428/317.9 |
| 7,264,878 B2 | 9/2007 | Miller et al. .................. 428/408 |
| 7,393,577 B2 | 7/2008 | Day et al. ...................... 428/121 |
| 7,731,046 B2 | 6/2010 | Johnson ..................... 220/62.15 |
| 7,785,693 B2 | 8/2010 | Johnson et al. ................. 428/99 |
| 7,851,048 B2 | 12/2010 | Brandon et al. ............. 428/178 |
| 2003/0213544 A1 | 11/2003 | Hesch ............................. 156/79 |
| 2004/0053035 A1 | 3/2004 | Haas ....................... 428/311.51 |
| 2004/0247856 A1 | 12/2004 | Sikorski et al. ............ 428/318.4 |
| 2005/0019549 A1 | 1/2005 | Tai et al. .................... 428/315.9 |
| 2005/0074593 A1 | 4/2005 | Day et al. ................... 428/292.1 |
| 2005/0146076 A1 | 7/2005 | Alexander et al. ............ 264/257 |
| 2006/0148917 A1 | 7/2006 | Radwanski et al. ............. 521/99 |
| 2010/0025525 A1 | 2/2010 | Van de Rostyne et al. 244/17.19 |

FOREIGN PATENT DOCUMENTS

| | | |
|---|---|---|
| FR | 2 560 819 | 9/1985 |
| WO | WO 97/03828 | 2/1997 |
| WO | WO 01/47706 | 7/2001 |
| WO | WO 2005/018926 | 3/2005 |

OTHER PUBLICATIONS

Patent Cooperation Treaty PCT International Search Report. Date of Mailing, Jul. 25, 2012. International Application No. PCT/US2012/022551. International Filing Date, Jan. 25, 2012.

\* cited by examiner

METHOD AND APPARATUS FOR COMBINING ELONGATED STRIPS

FIELD OF THE INVENTION

The present invention relates to method and apparatus for combining elongated strips. More specifically, the present invention relates to a method and apparatus for wrapping and/or bonding elongated strips with a flexible material.

BACKGROUND

High strength, low density materials have been used in the manufacture of a special class of composites known as sandwich panels. In one exemplary construction, such panels can include a relatively low density core that is sandwiched between thin but stiff materials. The resulting panel can have a high bending stiffness but a relatively low weight that is useful in a variety of applications including e.g., marine, infrastructure, and transportation. Open and closed cell materials including balsa wood or foams created from e.g., polystyrene, polyvinylchloride, polyurethane, or polyethylene can be used for the lower density core. Glass or carbon fiber reinforcement fabrics can be used for the outer layer(s) of thin materials. Various adhesives may be used to combine these materials into the desired composite panel.

U.S. Pat. No. 7,851,048, incorporated herein by reference, describes exemplary embodiments of a composite in the form of a fiber reinforced core panel constructed with strips. For example, in one of its exemplary embodiments, U.S. Pat. No. 7,851,048 provides a panel constructed from a plurality of low density, elongated strips having a reinforcement sheet that is wrapped around, and positioned between, the elongated strips. The relatively thin intermediate structure provided by the reinforcement sheet and elongated strips can be further provided with layers or skins of material on one or both sides to provide e.g., additional stability or strength. Various shapes for the strips may be applied as well as variations in the reinforcement and skins.

The manufacture of a composite such as e.g., the panel described in U.S. Pat. No. 7,851,048 can be time consuming and labor intensive. The positioning of multiple strips within various layers can require repeated transport and handling of each in order to provide the desired orientation of the strips for the resulting panel. Additional complexity is created by the use of multiple layers for the reinforcement sheet and/or the skins and the use of e.g., adhesives to combine these elements of the panel.

Accordingly, a need exists for a method, apparatus, or both that can be used to manufacture a composite panel or an intermediate that may be used in the manufacture of such a composite panel. More particularly, a system for combining multiple strips with one or more flexible materials (such as reinforcement layers and/or adhesive layers) wrapped around the strips would be very useful. Such a system that can also be used to adhere the strips together with the flexible materials would also be beneficial. Additional utility would be provided where such system also allows for one or more layers to be provided to the outside of the combined strips.

SUMMARY

Aspects and advantages of the invention will be set forth in part in the following description, or may be obvious from the description, or may be learned through practice of the invention.

In one exemplary aspect, the present invention provides a method of forming a reinforced structure. The steps of such method can include providing a first strip having a longitudinal axis, the first strip having at least three faces that extend in a direction along the longitudinal axis, the at least three faces comprising a first face, a second face, and a third face; moving the first strip into contact with a flexible material and wrapping the flexible material about the first face and the second face; wrapping the flexible material about the third face; pushing the first strip along a direction that is substantially perpendicular to its longitudinal axis; and, constraining the first strip along its longitudinal axis so as to maintain the wrapping of flexible material about the first strip.

In another exemplary embodiment of the present invention, an apparatus is provided for forming a reinforced structure from a plurality of strips and a flexible material where the strips have a length that defines a longitudinal axis. The apparatus includes a channel formed by first and second opposing surfaces. The opposing surfaces are separated by a distance configured for receipt of the thickness of the strips wrapped with the flexible material. The channel has a length configured for receipt of the length of the strips. The channel defines a first side and a second side. A first infeed of strips is positioned along the first side of the channel. A first actuator is located about the first side of the channel. The first actuator is movable towards the channel and is configured for moving strips from the first side towards and into the channel. A second infeed of strips is located along the second side of the channel that is opposite the first side. A second actuator is positioned about the second side of the channel. The second actuator is movable towards the channel and is configured for moving strips from the second side towards and into the channel in an alternating manner with the first actuator. An infeed of the flexible material is positioned adjacent to the channel and between the first and second actuator. The infeed of the flexible material is configured for supplying the flexible material into the channel.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

The present invention provides a method and apparatus for combining elongated strips. More specifically, the present invention relates to a method and apparatus for wrapping and/or bonding elongated strips with a flexible material. "Flexible", in this application means that the material is capable of being bent without breaking. Additionally, layers of e.g., a stabilizing material may be added to the intermediate formed by the elongated strips and flexible material. For purposes of describing the invention, reference now will be made in detail to embodiments and/or methods of the invention, one or more examples of which are illustrated in or with the drawings. Each example is provided by way of explanation of the invention, not limitation of the invention. In fact, it will be apparent to those skilled in the art that various modifications and variations can be made in the present invention without departing from the scope or spirit of the invention. For instance, features or steps illustrated or described as part of one embodiment, can be used with another embodiment or steps to yield still further embodiments or methods. Thus, it is intended that the present invention covers such modifications and variations as come within the scope of the appended claims and their equivalents.

Figure 1:
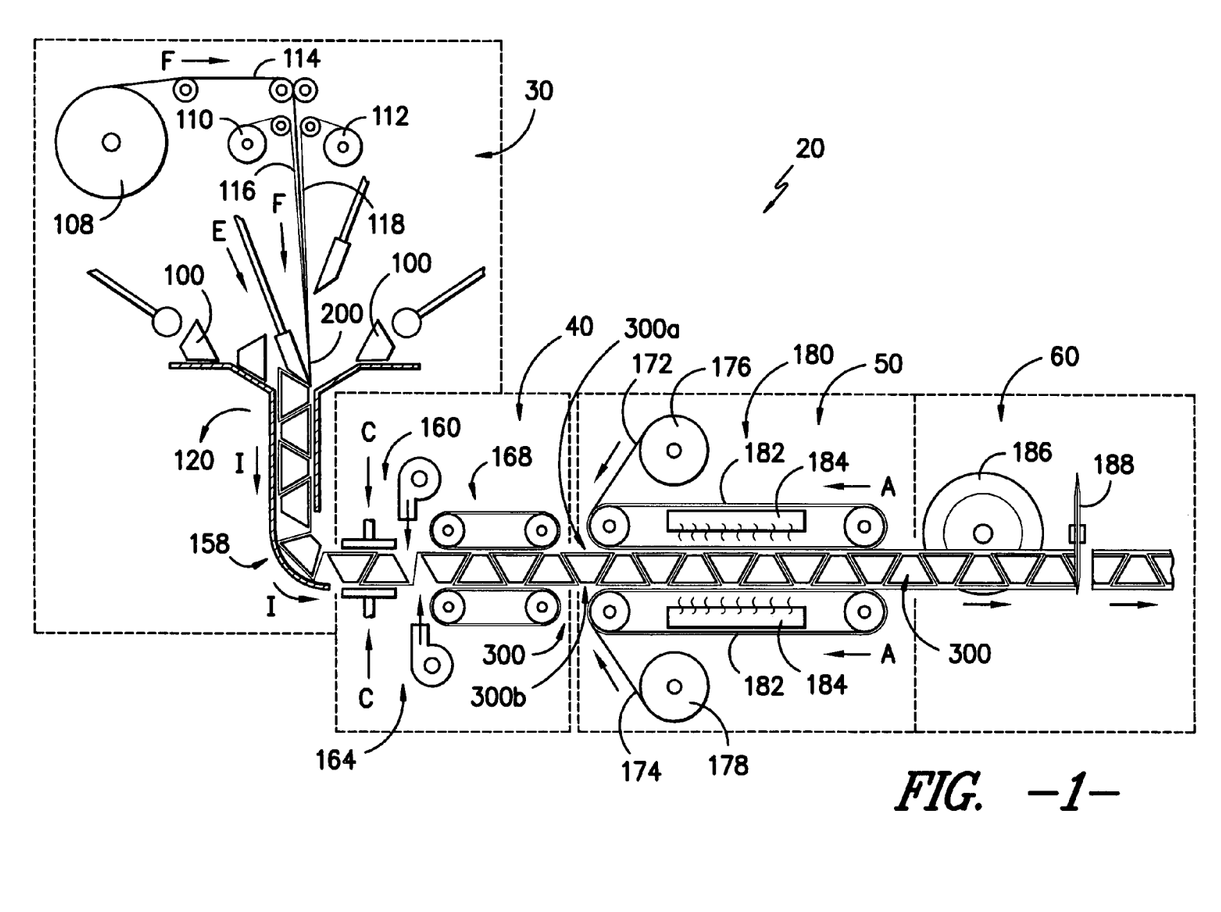
FIG. 1 provides a schematic view of an exemplary embodiment of a manufacturing process that can be used to combine multiple strips to create e.g., a composite panel or an intermediate for a composite panel.

FIG. 1 provides an overall view of a manufacturing process 20 as may be used for combining elongated strips 100 with a flexible material 200 that is positioned between, and wrapped at least partially around, the elongated strips 100. As will be further described, process 20 includes a formation section 30, an internal bonding section 40, an external bonding section 50, and a cutting section 60 that could each be used separately or in different combinations from what is shown in FIG. 1 as will be understood using the teachings disclosed herein.

Figure 12:
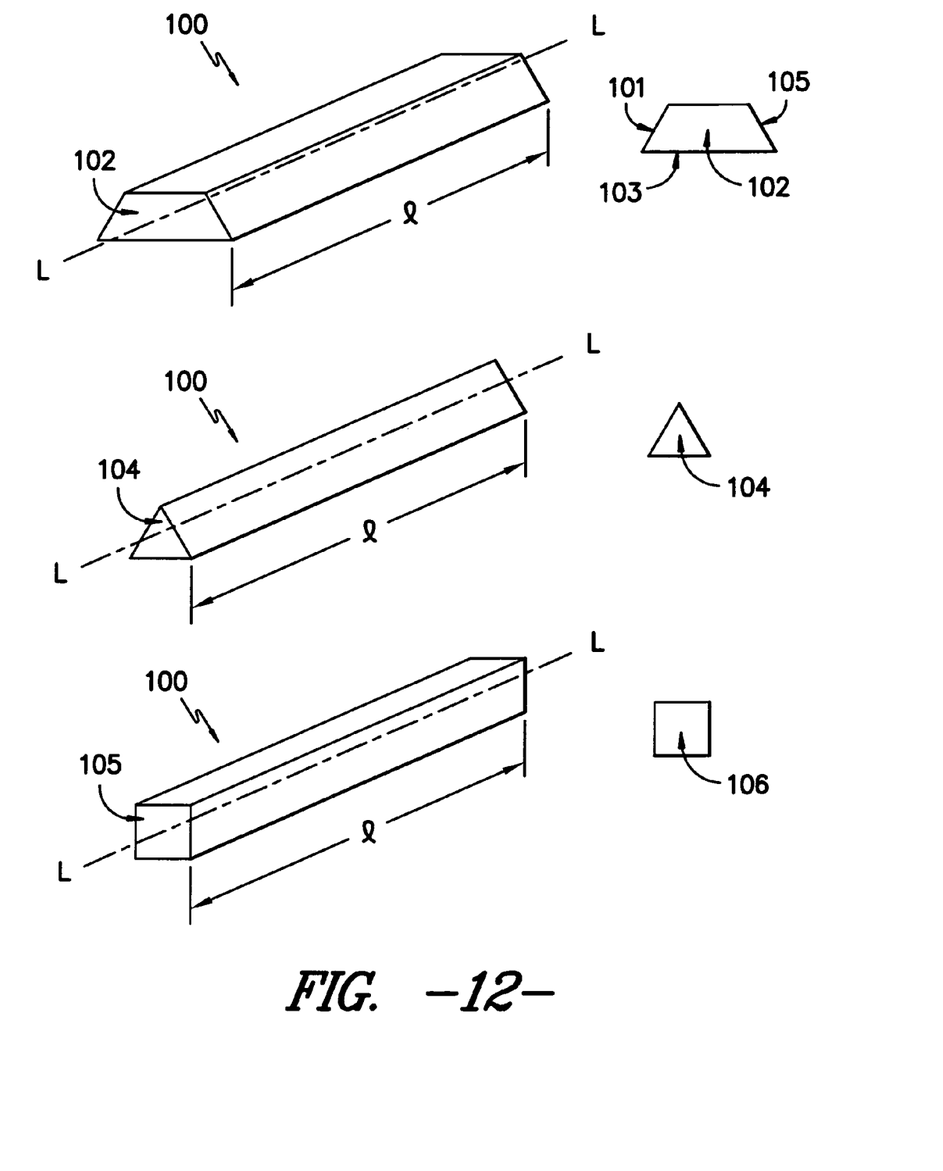
FIG. 12 provides a perspective view of exemplary strips as may be combined using the present invention.

Referring to FIG. 12, elongated strips 100 can be constructed with a variety of different profiles or cross-sectional shapes including, for example, trapezoidal 102, triangular 104, and square 106. Each strip 100 has a longitudinal axis L and at least three faces extending along such longitudinal axis. For example, strip 100 with trapezoidal shape 102 includes first face 101, second face 103, and third face 105. Cross-sectional shapes having a larger number of faces such as e.g., four faces may be used as well. The low density strips 100 may be formed from any suitable materials including but not limited to foam (closed-cell or open-cell), balsa wood, and sealed plastic strips. The foam may be, for example, polyurethane foam, expanded polystyrene foam, expanded polyethylene foam, expanded polypropylene foam, or a copolymer thereof. The strips may be formed e.g., of a rigid foam such as PVC, styrene acrylonitrile (SAN), or polymethacrylimide (PMI); a fire resistant foam such as phenolic; or hollow tubes made of plastic, metal, paper, or the like.

For this exemplary embodiment, formation section 30 includes feed rolls 108, 110, and 112 that provide materials which are combined in layers to create flexible material 200. Each roll 108, 110, and 112 can be provided with a tensioning device to maintain tension on the materials pulled from each roll during operation of manufacturing process 20. Such tensioning can assist in preventing the creation of folds or wrinkles in the material as it is applied to strips 100. A different number of feed rolls may be used from that shown in FIG. 1. For example, flexible material 200 may be created from a single material such that only one roll is needed. Alternatively, more than three rolls may be used as well.

By way of example, feed roll 108 may provide a reinforcement material 114 that becomes a layer in flexible material 200 as illustrated in FIG. 1. Reinforcement material 114 can include, but is not limited to, a woven, knit, bonded textile, nonwoven (such as a chopped strand mat), or sheet of strands. Reinforcement material 114 can be unidirectional strands such as rovings and may be held together by bonding, knitting a securing yarn across the rovings, or weaving a securing yarn across the rovings. In the case of woven, knit, warp knit/weft insertion, nonwoven, or bonded, the textile can have yarns or tape elements that are disposed in a multi-(bi- or tri-) axial direction. The yarns or fibers of the reinforcing material 114 may be, for example, fiberglass, carbon, polyester, aramid, nylon, natural fibers, and mixtures thereof. The continuous fibrous reinforcement material 114 can be a multi-axial knit. A multi-axial knit has high modulus, non-crimp fibers that can be oriented to suit a combination of shear and compression requirements. The fibers may be monofilament, multifilament, staple, tape elements, or a mixture thereof. Glass rovings are preferred due to their low cost, relatively high modulus, and good compatibility with a variety of resins. The fibers used in the reinforcement material sheet 114 can have a high strength to weight ratio. For example, preferably the fibers have a strength to weight ratio of at least 1 $GPa/g/cm^3$ as measured by standard fiber properties at 23° C. and a modulus of at least 70 GPa.

Feed rolls 110 and 112 can provide e.g., layers 116 and 118 of an adhesive. For example, layers 116 and 118 may comprise a nonwoven adhesive web that is activated in the presence of heat and bonds upon cooling, such as polyamide adhesive scrim. As shown in FIG. 1, layers 116 and 118 are positioned along both sides of reinforcement material 114 to create flexible material 200, which is in turn wrapped around strips 100 as will be described below. Other combinations may be used as well. For example, multiple layers may be applied to one or both sides of reinforcement material 114. Additionally feed rolls 110 and 112 can be removed so that no adhesive is provided or reinforcement material 114 may contain an adhesive.

Figure 2:
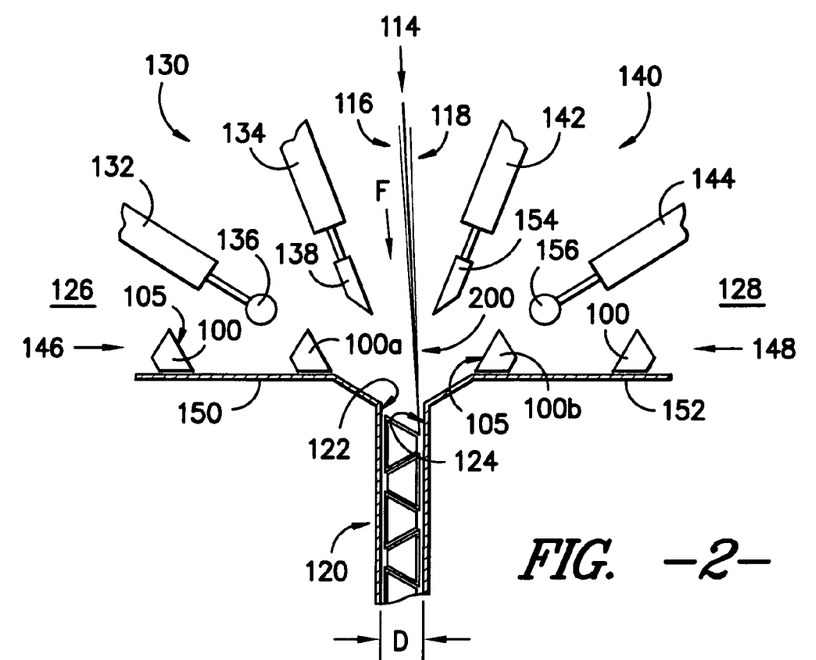
FIGS. 2 through 7 provide schematic views of an exemplary embodiment of an apparatus as may be used to position, wrap, and advance multiple strips according to an exemplary method also illustrated by these figures.

Turning now to FIG. 2, formation section 30 also includes a channel 120 that is defined by a first opposing surface 122 and a second opposing surface 124. Opposing surfaces 122 and 124 are separated by a distance D that is configured for the thickness of strips 100 that are wrapped with flexible material 200 and fed into channel 120 as shown in FIG. 2. Channel 120 has a length (a dimension perpendicular to the page as viewed by the reader) that is configured for receipt of the length l (see FIG. 12) of strips 100. Channel 120 also defines a first side 126 and a second side 128, which are located on opposing sides of channel 120 as well as opposing sides of the infeed of flexible material 200.

First side 126 of channel 120 is equipped with an actuator 130 that, for this exemplary embodiment, is constructed from a pusher mechanism 132 and a tucker mechanism 134. Pusher mechanism 132 includes a contact 136 that can be extended (as shown by arrow E in FIG. 3) so as to contact and push strip 100 towards and into channel 120 as well as into contact with flexible material 200. Tucker mechanism 134 includes a contact shoe 138 that can be used to contact flexible material 200 and wrap such material about strip 100. Second side 128 also includes an actuator 140 with a tucker mechanism 142 and a pusher mechanism 144 that operate similar to mechanisms 132 and 134 albeit for strips 100 located on second side 128. Mechanisms 132, 134, 142, and 144 could each be constructed from e.g., a ball screw actuator driven by a servo motor. Although shown as separate devices, it should also be understood that pusher mechanism 132 and tucker mechanism 134 could be constructed from a single mechanism in order to provide actuator 130. Likewise, mechanisms 142 and 144 could be constructed as a single mechanism for actuator 140. Other configurations for actuators 130 and 140 may be used as well including configurations using more than two mechanisms.

Continuing with FIG. 2, first side 126 also includes a first infeed 146 of strips 100 while second side 128 includes a second infeed of strips 148. As shown, infeeds 146 and 148 each consist of a plurality of strips 100 that are placed onto surfaces 150 and 152 for manipulation by actuators 130 and 140. For strips 100 having a trapezoidal cross section 102 as shown, the second face 103 of strips 100 in both of the infeeds 146 and 148 are oriented towards channel 120. As such, the orientation of each strip 100 can be flipped relative to the orientation of an adjacent strip 100 once positioned within channel 120 as shown in FIG. 2. By way of example, infeeds 146 and 148 can be created manually by an operator placing strips 100 on surfaces 150 and 152. Alternatively, conveyors could be placed on each of sides 126 and 128 to operate in synchronization with actuators 130 and 140. Other configurations for supplying infeeds 146 and 148 may be used as well.

Figure 3:
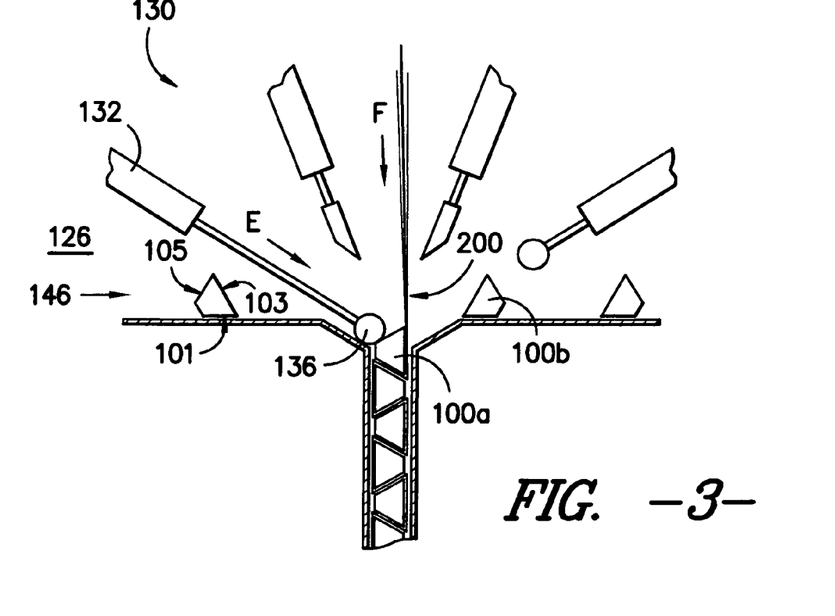

Referring now to FIG. 3, in operation a first strip 100a from first side 126 is moved by the extension (arrow E) of pusher mechanism 132. Strip 100a is pushed into contact with flexible material 200, which is fed (arrow F) between actuators 132 and 140 and into channel 120. More specifically, the contact 136 of pusher mechanism 132 contacts the third face 105 so as to push strip 100a along a direction that is basically perpendicular to its longitudinal axis L. Such action causes flexible material 200 to be wrapped about first face 101 and second face 103 of strip 100a. In addition, a certain amount of flexible material 200 is drawn into channel 120 as it is wrapped around strip 100a.

Figure 4:
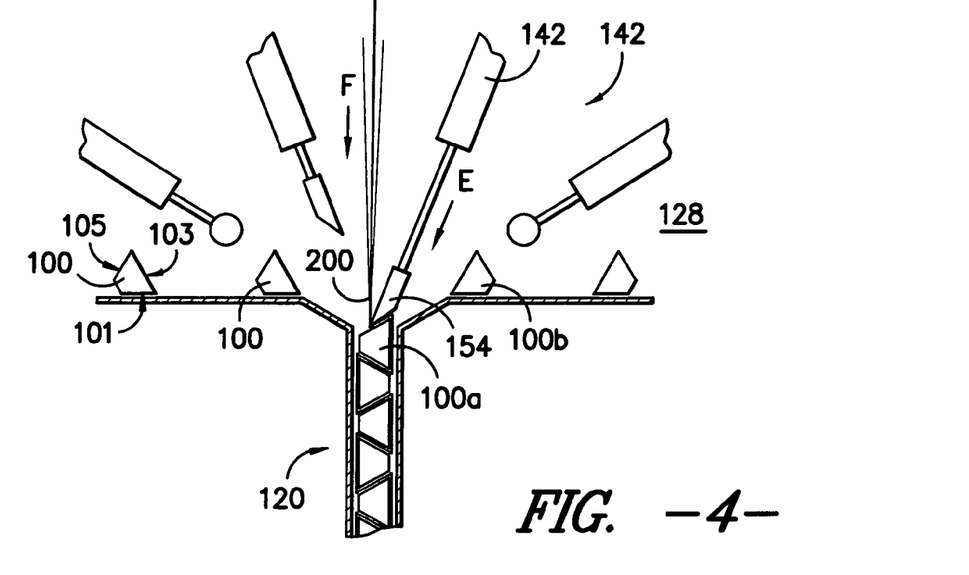
Figure 5:
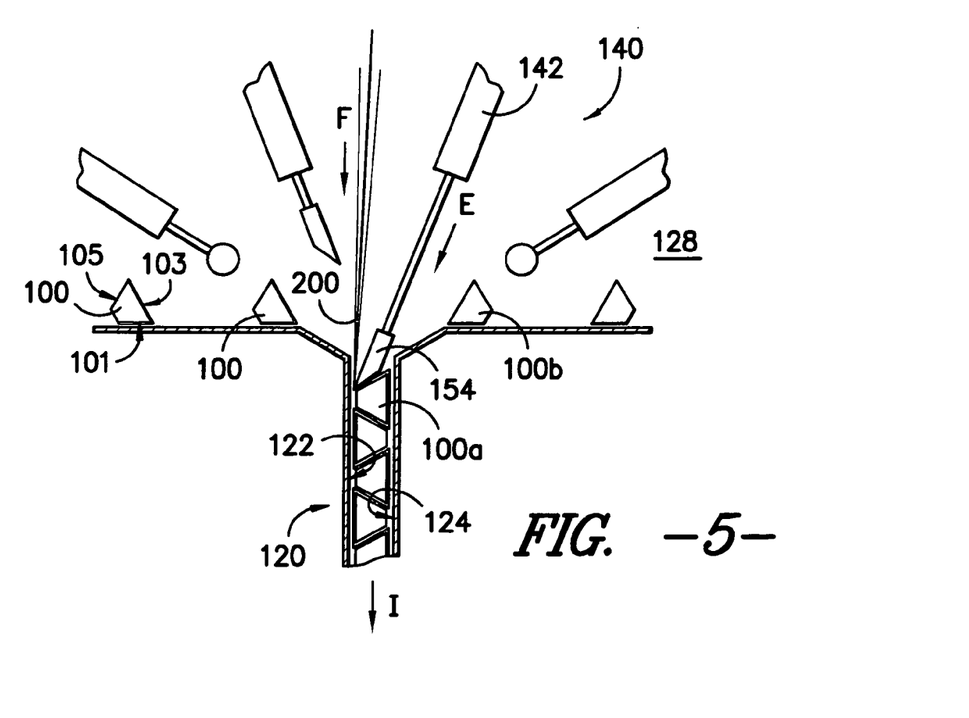

Continuing to FIG. 4, tucker mechanism 142 on second side 128 is then extended (arrow E) such that contact shoe 154 wraps flexible material 200 about the third face 105 of strip 100a. As tucker mechanism 142 continues its extension and wrapping as shown in FIG. 5, strip 100a is pushed further into channel 120, which causes the previously wrapped strips 100 in channel 120 to be indexed downstream as shown by arrow I. Again, this action causes an additional amount of flexible material 200 to be drawn into channel 120. Opposing surfaces 122 and 124 operate to constrain multiple strips 100 that have already been wrapped and inserted into channel 120 so that placement of flexible material 200 about strips 100 is maintained.

Figure 6:
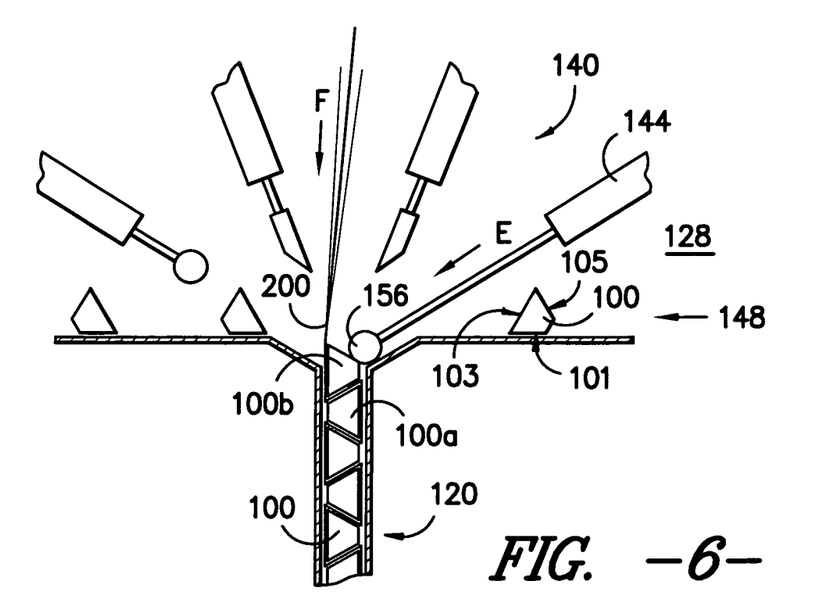

Next, as shown in FIG. 6, pusher mechanism 144 on second side 128 is extended as shown by arrow E so that contact 156 moves a second strip 100b from second infeed 148 towards channel 120 and along a direction that is basically perpendicular to the longitudinal axis l of strip 100b. As shown, contact 156 pushes strip 100b along third face 105 until strip 100b is moved into channel 120 and wrapped with flexible material 200 about first face 101 and second face 103. As this occurs, flexible material 200 is drawn into channel 120.

Figure 7:
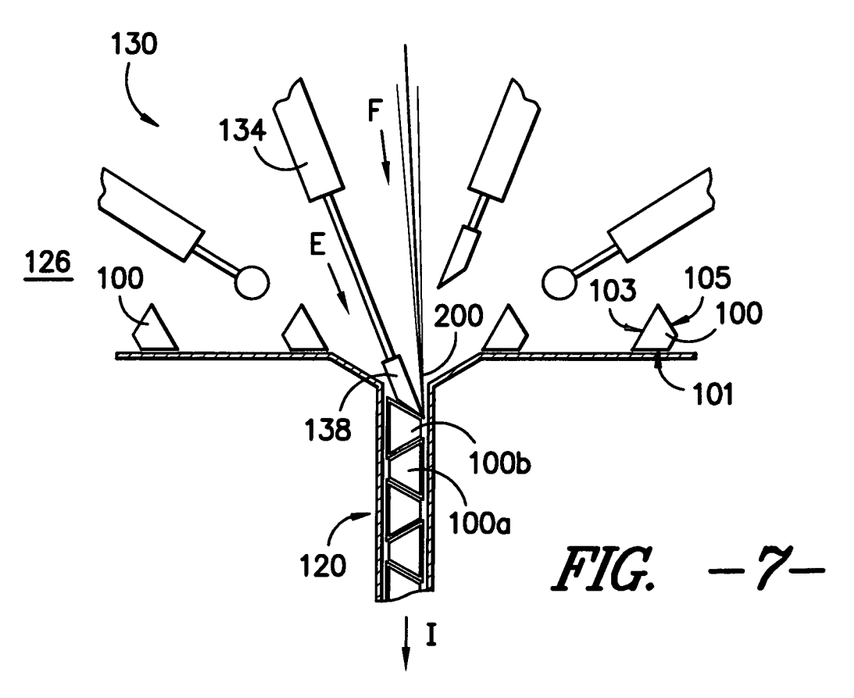

Viewing now FIG. 7, tucker mechanism 134 on first side 126 is now extended (arrow E) such that contact shoe 138 wraps flexible material 200 about the third face 105 of strip 100b. As tucker mechanism 134 continues its extension and wrapping, strip 100b is pushed further into channel 120, which causes the previously wrapped strips 100 in channel 120 to be indexed downstream as shown by arrow I and also causes second strip 100b to be positioned against the third face 105 of first strip 100a with the longitudinal axis l of strips 100a and 100b being substantially parallel. This same movement of strip 100b also causes an additional amount of flexible material 200 to be drawn into channel 120. Opposing surfaces 122 and 124 operate to constrain multiple strips 100 that have already been wrapped and inserted into channel 120 so that placement of flexible material 200 about strips 100 is maintained.

Accordingly, the process illustrated in FIGS. 4 through 7 continues so as to provide a plurality of strips 100 wrapped with flexible material 200 and positioned in channel 120. As described and shown, the tucking and wrapping alternates between sides 126 and 128 and wrapped strips 100 are fed or indexed downstream in the machine direction as shown by arrows I. While this operation has been described with regard to the use of trapezoid-shaped strips 100, using the teachings disclosed herein, one of skill in the art will understand that a similar process can be used for strips 100 having other shapes as well.

Returning to FIG. 1, as strips 100 are wrapped and fed downstream (arrows I), channel 120 feeds the strips 100 to internal bonding section 40. For the exemplary embodiment depicted in FIG. 1, channel 120 is shown as having a curve 158. Such is provided by way of example only. Channel 120 could be straight at all points or have multiple curves depending upon e.g., the particular configuration required for an installation or application.

FIGS. 8 through 11 provide close up views of internal bonding section 40 where strips 100 wrapped in flexible material 200 are received from formation section 30. Internal bonding section 40 includes a clamping mechanism 160 constructed from a pair of clamping plates 162 positioned about opposing sides of the stream of strips 100 and flexible material 200. Clamping plates 162 can be used to hold the position of multiple strips 100 wrapped with flexible material 200. For example, as shown by arrows C in FIGS. 1 and 9, clamping plates 162 have been pressed against several strips 100 and a portion of flexible material 200 to hold their position. Conversely, as shown by arrows R in FIGS. 8, 10, and 11, clamping plates 162 have been released so that strips 100 and flexible material 200 can be indexed forward or moved in the downstream direction.

As also illustrated in FIGS. 8 through 11, internal bonding section 40 includes a first heating device 164 created by a set of hot air blowers 166. Blowers 166 are positioned downstream of the clamping mechanism 160 and are also positioned about opposing sides of the stream of strips 100 and flexible material 200. Blowers 166 can be used to apply heated air (arrows H) to the flexible material 200 particularly when strips 100a and 100b are separated to expose the flexible material 200 that is located between such strips as shown more particularly in FIG. 9. Blowers 166 can be operated at other times in the process as well. The configuration of heating device 164 with blowers 166 is provided by way of example only. Other configurations can also be used such as e.g., a single blower on one side, an adhesive applicator (such as an adhesive sprayer or powder coater with blowers) on one or both sides, and others as well. A variety of adhesive types may be applied such as e.g., hot melt, UV adhesives, and others could also be used.

A first conveying device 168 is positioned downstream of first heating device 164. First conveying device 168 is constructed from a pair of conveyors 170 positioned about opposing sides of the stream of strips 100 and flexible material 200. Conveyors 170 are spaced apart from each other by an amount that is about equal to the thickness of the strips 100 wrapped with flexible material 200. Each conveyor 170 rotates as shown by arrows A in FIG. 8 and contacts the stream of strips 100 and flexible material 200 to advance the same downstream along the machine direction (see arrows I in FIG. 8). As will be discussed below, conveyors 170 can be selectively activated as needed to move the strips 100 and flexible material 200 on needed.

Figure 8:
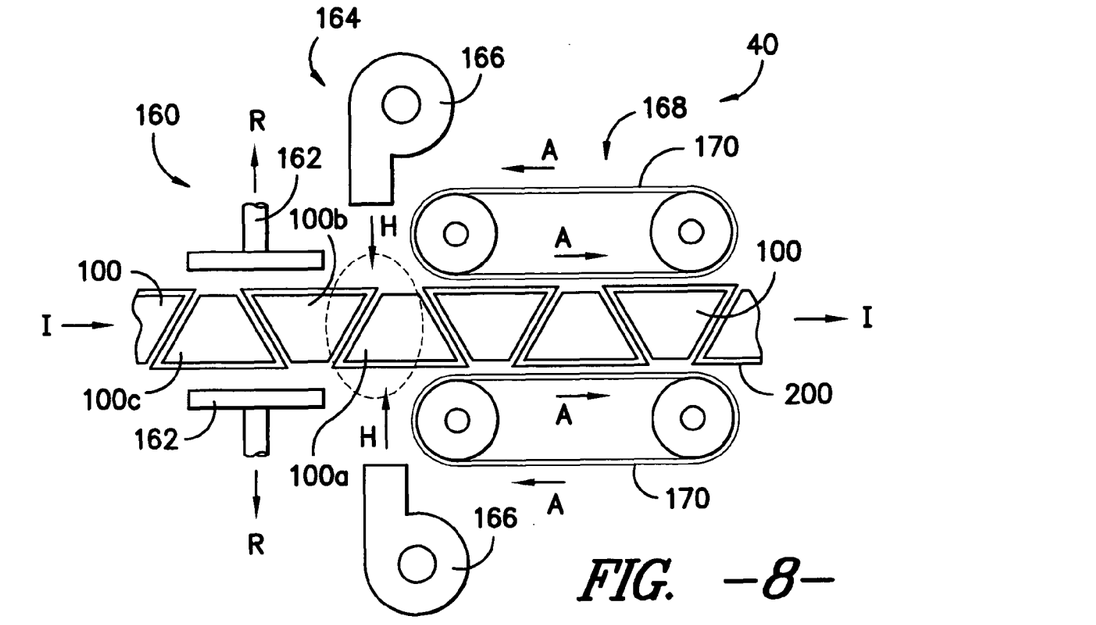
FIGS. 8 though 11 provide schematic views of an exemplary embodiment of an apparatus as may be used to adhere multiple strips to each other using a flexible material, and may also be used to attach one or more layers to the outside of the strips according to an exemplary method also illustrated by these figures.

Accordingly, in order to bond adjacent strips 100 together with flexible material 200, internal bonding section 40 operates as follows Starting with FIGS. 1 and 8, the stream of strips 100 and flexible material 200 is advanced (arrows I) from formation section 30 to bonding section 40 as strips 100 are wrapped and pushed into channel 120 as previously described. During such time, the pair conveyors 170 are activated (arrow A) to assist in moving the stream of strips 100 and flexible material 200 downstream as shown by arrow I in FIG. 8. As will be understood from the discussion of formation section 30 above, the stream of strips 100 and flexible materials 200 advances by one strip 100 at a time as individual strips 100 are wrapped and tucked in formation section 30.

Figure 9:
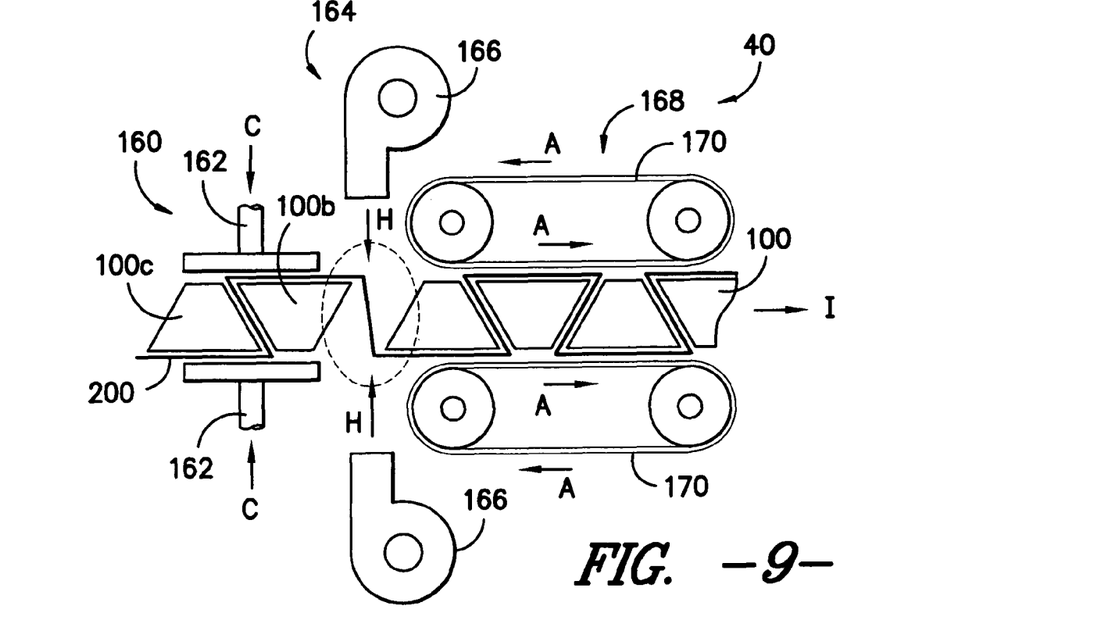

Referring now to FIG. 9, after advancing by one strip 100, the clamping plates 162 are activated to press upon (arrows C) the strips 100 and flexible material 200 that are between plates 162, which stops the movement of this material. Next, the rotation of conveyors 170 (as shown by arrows A) causes a separation between the upstream first strip 100a and the downstream second strip 100b. This separation exposes a portion of the flexible material 200 that was positioned between first strip 100a and second strip 100b. While exposed, blowers 166 are able to push hot air across flexible material 200 to activate the adhesive materials 116 and 118 that were applied to reinforcement material 114 in formation section 30.

Figure 10:
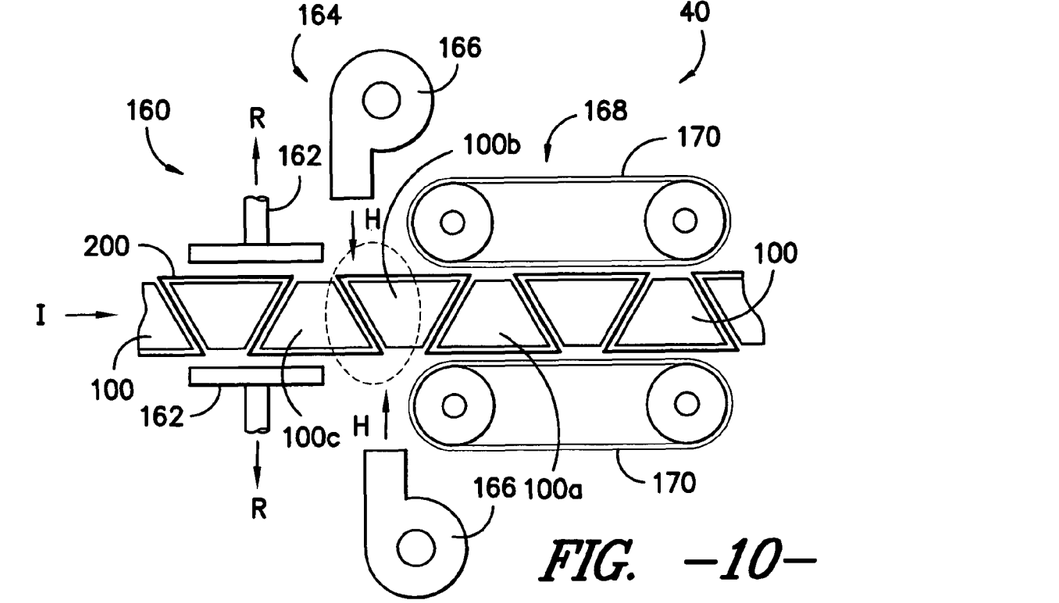
Figure 11:
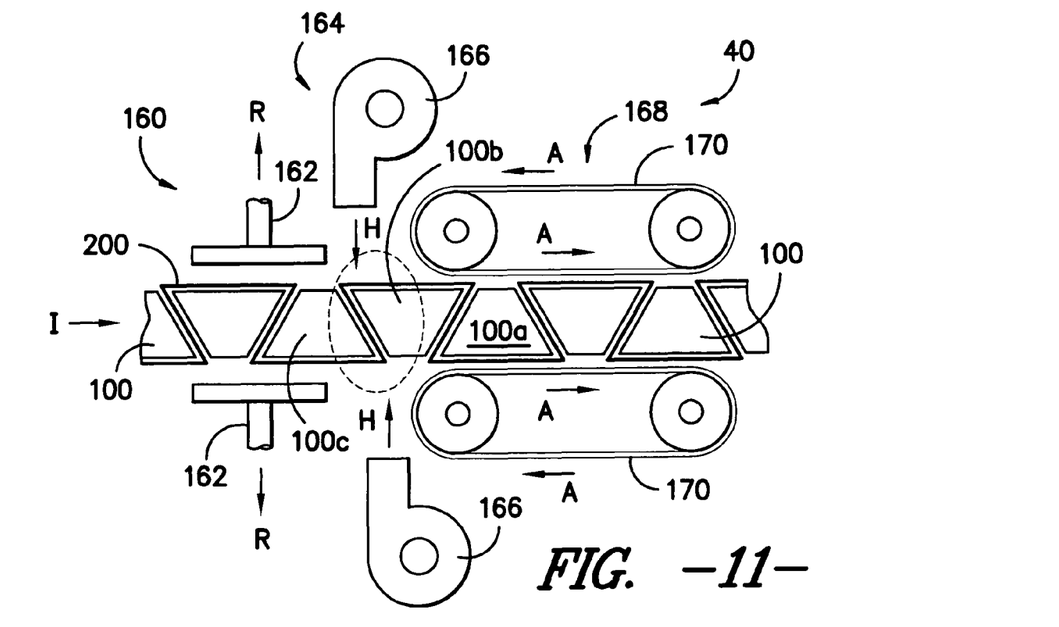

Upon being heated a sufficient time to activate the adhesive, clamping plates 162 are released as shown by arrows R in FIG. 10. At this same time, first conveying device 168 remains inactive such that the strips 100 and flexible material 200 positioned between conveyors 170 are fixed in position. As a result, when the stream of strips 100 and flexible material 200 upstream of conveying device 168 is indexed forward (arrow I), the second strip 100b is pressed against first strip 100a to provide a pressure that along with the adhesive materials acts to bond strips 100a and 100b together. This pressure is maintained until strips 100a and 100b are sufficiently bonded together such that separation will not occur upon being moved along the machine direction. If needed, after activation of the adhesive and contacting of the strips, blowers 166 can be deactivated to allow cooling of the adhesive. After sufficiently bonding together, strips 100 and flexible material 200 are indexed forward or downstream as shown in FIG. 11. This movement causes strips 100a and 100b to be moved so that the internal bonding process as just described for section 40 can be repeated again between strips 100b and 100c, and so forth.

As shown in FIG. 1, strips 100 that are joined together with flexible material 200 in the internal bonding section 40 form an intermediate 300 that is advanced downstream to the external bonding section 50 where additional layers may be added to the exterior—i.e., opposing sides—of intermediate 300. For example, it may be desirable to add layers of stabilizing materials 172 and 174 to one or both of the opposing sides 300a and 300b of intermediate 300. The materials can be provided from feed rolls 176 and 178, which may be equipped with tensioning devices.

Stabilizing materials 172 and 174 may comprise e.g., textiles such as scrims that are applied to intermediate 300 to facilitate its handling and transport. Such scrims restrict the rotation and movement of strips 100 except for rotation about their longitudinal axis f. Preferably, such scrims have open apertures and low surface area to allow the flow of resin into strips 100 during e.g., any subsequent impregnation processes that may be employed. Alternatively, stabilizing materials 172 and 174 may comprise one or more layers of skin materials as described in U.S. Pat. No. 7,851,048. By way of additional example, the stabilizing materials 172 and 174 may comprise both layers of the scrims and the skin materials. As such, additional feed rolls may be added to supply materials along with feed rolls 176 and 178.

A second conveying device 180 is positioned downstream of first conveying device 168 and includes a pair of conveyors 182 positioned on the opposing sides 300a and 300b of intermediate 300. Conveyors 182 rotate to pull stabilizing materials 172 and 174 into the space between the conveyors 182 and against the sides 300a and 300b of intermediate 300. As intermediate 300 and materials 172 and 174 are advanced through conveyors 182, pressure is applied to the same. If need, a second heating device in the form of heaters 184 can be used to activate, for example, adhesives that are present in stabilizing materials 172 and/or 174 or flexible materials 200. Accordingly, stabilizing materials 172 and 174 can be bonded as layers onto intermediate 300 as such pass through conveyors 182.

Finally, the intermediate 300 with one or more layers of stabilizing materials is advanced downstream to cutting section 60. As shown in FIG. 1, cutting section 60 includes a first saw 186 and a second saw 188 that may be used to cut intermediate 300 into the lengths and widths desired. Multiple saws can be used in place of the first and or second saw. For example, first and second saws 186 and 188 may be used to cut intermediate 300 into panels 4 feet wide by 8 feet long as is commonly used in construction materials. Other dimensions may be used as well.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method of forming a reinforced structure, the steps comprising:

providing a first strip having a longitudinal axis, the first strip having at least three faces that extend in a direction along the longitudinal axis, the at least three faces comprising a first face, a second face, and a third face;

moving the first strip into contact with a flexible material and wrapping the flexible material about the first face and the second face, wherein the flexible material comprises a reinforcement material and an adhesive;

wrapping the flexible material about the third face;

pushing the first strip along a direction that is substantially perpendicular to its longitudinal axis;

constraining the first strip along its longitudinal axis so as to maintain the wrapping of flexible material about the first strip;

providing a second strip having a longitudinal axis, the second strip also having at least three faces that extend in a direction along the longitudinal axis;

repeating said steps of pushing, wrapping, and constraining with the second strip such that the second strip is positioned against the third face of the first strip with the longitudinal axis of the second strip and the first strip being substantially parallel, and whereby the flexible material is positioned between the first strip and the second strip;

separating the first strip and the second strip so as to expose the flexible material located between the first strip and the second strip;

activating the adhesive in the flexible material exposed during said step of separating; and, pressing the first strip and the second strip back together with the flexible material located between so as to bond together the first strip and the second strip.

2. A method of forming a reinforced structure as in claim 1, wherein said step of moving comprises pushing the first strip along the third face so as to move the strip into contact with a flexible material and wrap the flexible material about the first face and the second face.

3. A method of forming a reinforced structure as in claim 1, wherein said steps of wrapping and moving occur simultaneously.

4. A method of forming a reinforced structure as in claim 1, further comprising the step of moving the flexible material towards the first strip during said wrapping step.

5. A method of forming a reinforced structure as in claim 1, wherein said pressing step is continued until the adhesive of the flexible material has bonded together the first strip and the second strip.

6. A method of forming a reinforced structure as in claim 1, wherein said step of activating the adhesive comprises applying heat, UV light, or both to the flexible material.

7. A method of forming a reinforced structure as in claim 1, further comprising the steps of:

applying stabilizing layers to both sides of an intermediate formed by the bonding together of the first strip and the second strip; and, pressing the stabilizing layers against both sides of the intermediate while applying heat so as to bond the stabilizing layers to the intermediate.

8. A method of forming a reinforced structure as in claim 7, wherein said stabilizing layers comprise scrims.

9. A method of forming a reinforced structure as in claim 7, further comprising the step of impregnating at least a portion of one or more of the flexible layer and the stabilizing layers.

10. A method of forming a reinforced structure as in claim 1, wherein the flexible material comprises:

a layer of reinforcement material;

a first layer of adhesive material positioned along one side of the layer of reinforcement material; and, a second layer of adhesive material positioned along an opposing side of the layer of reinforcement material.

\* \* \* \* \*